United States Patent [19]

Nagao et al.

[11] Patent Number: 4,787,877
[45] Date of Patent: Nov. 29, 1988

[54] STRUCTURE FOR POSITIONING A FRICTION MEMBER IN A DAMPER DISC

[75] Inventors: Tamio Nagao, Hirakata; Toru Hamada, Takatsuki; Toshiaki Kikuchi, Kadoma, all of Japan

[73] Assignee: Kabushiki Kaisha Daikin Seisakusho, Osaka, Japan

[21] Appl. No.: 941,127

[22] Filed: Dec. 12, 1986

[30] Foreign Application Priority Data

Dec. 16, 1985 [JP] Japan .................... 60/193321[U]

[51] Int. Cl.⁴ .............................................. F16D 3/14
[52] U.S. Cl. .................... 464/64; 192/106.2; 464/68
[58] Field of Search .................. 192/106.1, 106.2; 464/64, 66, 67, 68

[56] References Cited

U.S. PATENT DOCUMENTS 4,088,212  5/1978  Brown ................. 192/106.2
4,569,430  2/1986  Raab et al. ........... 464/68 X
4,577,743  3/1986  Raab et al. ........... 192/106.2
4,651,860  3/1987  Nagano .............. 464/68 X Primary Examiner—Daniel P. Stodola
Attorney, Agent, or Firm—Armstrong, Nikaido, Marmelstein & Kubovcik

[57] ABSTRACT

A structure for radially positioning a friction member in a damper disc comprises an output hub including a radial flange; a pair of side plates rotatably disposed at opposite sides of the flange; a torsion spring mechanism operable to circumferentially connect the side plates to the flange; and a friction mechanism rotatable fitted around the hub and associated to the side plate for generating a friction force in accordance with relative torsion between the side plates and the flange; the friction mechanism including an annular friction member, of which outer periphery is radially held and guided concentrically to a center of the disc by circumferentially spaced projections formed on the adjacent side plate.

2 Claims, 2 Drawing Sheets

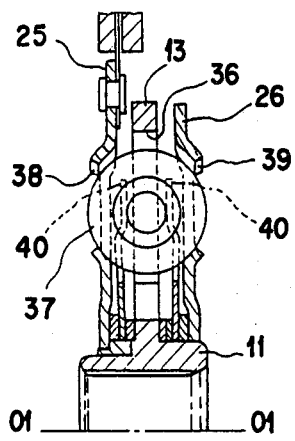
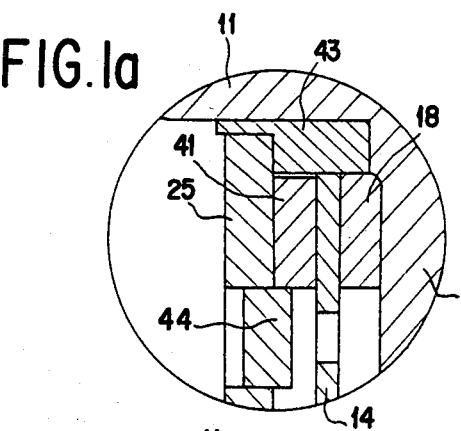
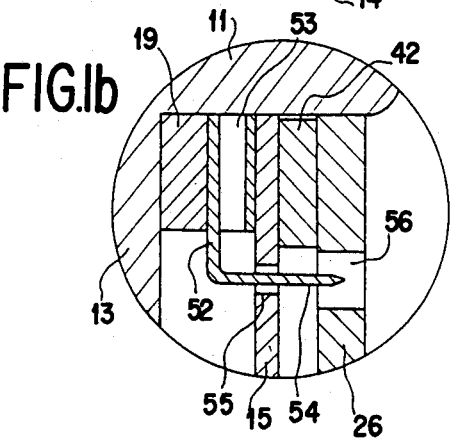
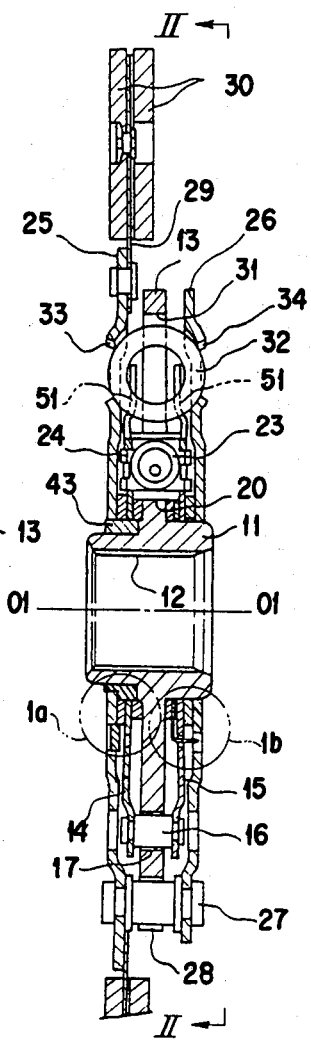

STRUCTURE FOR POSITIONING A FRICTION MEMBER IN A DAMPER DISC

BACKGROUND OF THE INVENTION

The present invention relates to a damper disc, which can be used as a clutch disc for automobiles, agricultural machines, industrial machines and others and can also be used as a damper employed in marine driving mechanisms, and more particularly, relates to a structure for radially positioning a friction member such as a friction washer in the disc.

Generally, a known damper disc comprises a output hub having a radial flange, a pair of side plates disposed at opposite sides of the flange and torsion or damper springs which are disposed in openings formed in the flange and side plates and extend in tangential direction of the disc to connect the side plates to the flange.

Some of the known damper discs include annular friction washers, which are interposed between the flanges and the side plates to absorb the torque vibration by friction caused on the friction washers. Usually, a space or play is formed radially inside the friction washer to set the friction washer rotatable around the hub.

However, in the known structure, the friction washer may radially move or deviate, and thus, the washer irregularly contacts the hub, which causes unstable friction, and thus, unstable hysteresis torque.

Accordingly, it is an object of the invention to provide an improved structure, overcoming the above-noted problems.

SUMMARY OF THE INVENTION

According to the invention, a structure for radially positioning a friction member in a damper disc comprises an output including a radial flange; a pair of side plates rotatably disposed at opposite sides of the flange; a torsion spring mechanism operable to circumferentially connect the side plates to the flange; and a friction mechanism rotatably fitted around the hub and associated to the side plate for generating a friction force in accordance with relative torsion between the side plates and the flange; the friction mechanism including an annular friction member, of which outer periphery is radially held and guided concentrically to a center of the disc by circumferentially spaced projections formed on the adjacent side plate.

Other and further objects, features and advantages of the invention will appear more fully from the following description of the preferred embodiments of the invention.

BRIEF DESCRIPTION OF THE DRAWINGS

FIG. 1 is a sectional view of a damper disc of an embodiment of the invention;

FIG. 1a is an enlarged sectional view taken at the area designated 1a, FIG. 1;

FIG. 1b is an enlarged sectional view taken at the area designated 1b, FIG. 1;

FIG. 3 is a sectional view taken along line III—III in FIG. 2.

DETAILED DESCRIPTION OF THE PREFERRED EMBODIMENTS

Figure 2:
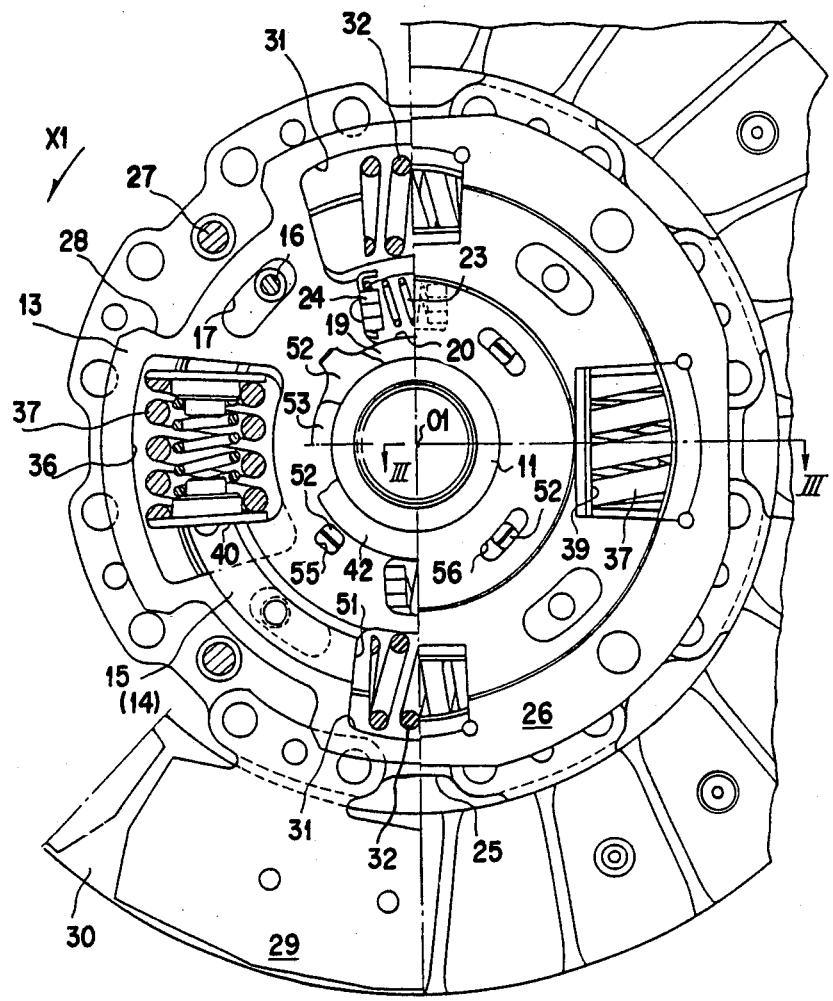
FIG. 2 is a fragmentary plan view taken along line II—II in FIG. 1 with certain parts cut away.

Referring to FIG. 1, a hub 11 includes inner spline teeth 12 for connecting to an output shaft, a center line of which is illustrated by line 01—01, and a radially outwardly extending annular flange 13. At opposite sides of the annular flange 13 are disposed a pair of sub plates 14 and 15, having radially outer portions rigidly connected by sub-pins 16 parallel to the center line 01—01. The sub-pins 16 extend through circumferentially long recesses or aperture 17. FIG. 2, respectively, formed in flange 13. The inner peripheries of sub-plates 14 and 15 are rotatably fitted around the hub 11, as will be detailed later.

Annular friction washers 18 and 19 are interposed between the radially inner portions of the flange 13 and the sub-plates 14 and 15. Further, an annular friction plate 52 contacting the washer 19 and an annular wave spring 58 contacting the sub-plate 15 are interposed between the washer 19 and the sub-plate 15.

The friction plate 52 is a flat steel member and is provided at the outer periphery with four circumferentially equally spaced tongues 54, bent axially (i.e., parallel to the center line 01—01) outwardly toward the sub-plate 15. The tongues 54 are not rotatable but are axially movable fitted into apertures 55 formed in the sub-plate 15. Thus, friction plate 52 rotates together with the sub-plate 15. The ends of the tongues 54 are projected beyond the apertues 55 and are fitted into circumferentially long apertures 56 formed in side plate 26, which will be detailed later, respectively. Each aperture 56 has a circumferential length for permitting free rotation between side plate 26 and friction plate 52 in an actual torsion operation.

The wave spring 53 is axially compressed between friction plate 52 and sub-plate 15 so that friction washer 18 is compressed between flange 13 and sub-plate 14 and the friction washer 19 is compressively pinched between the flange 13 and the friction plate 52.

The flange 13 and the sub-plates 14 and 15 are provided at diametrally opposite positions with two sets of axially registered openings 20, in which soft first torsion or damper springs 23 are fitted, respectively. Each spring 23 extends substantially in a tangential direction of the disc and is seated at opposite ends on spring seats 24, respectively.

Referring to FIG. 1, a side plate 25, i.e., a clutch plate, and the side plate 26, i.e., a retaining plate, are disposed at opposite sides of the rigidly connected sub-plates 14 and 15. Friction washers 41 and 42 are interposed between the radially inner portions of the sub-plates 14 and 15 and the side plates 25 and 26. The inner peripheries of the side plates 25 and 26 are rotatably fitted around the hub 11. A substantially cylindrical bushing 43 is interposed between the inner peripheries of the sub-plate 14 and the side plate 25 and the outer peripheries of the hub 11. Thus, the sub-plate 14 and the side plate 25 are rotatably supported by the hub 11 through the bushing 43.

The side plate 25 is provided at portions radially outside the friction washer 41 with projections 44 projected toward the flange 13 and formed by partially cutting and bending the side plate 25 simultaneously with a press-forming of the side plate 25 from a blank. The projections 44 are circumferentially aligned to each other to guide the outer periphery of the friction washer 41 at a position concentric to the bushing 43 and the hub 11. A narrow annular space is formed between the wahser 41 and the bushing 43. Since the friction washer 41 is held and radially positioned by the projections 44, the narrow space is maintained uniformly along the whole inner periphery of the washer 41, and the washer 41 is prevented from radially deviating and irregularly contacting the bushing 43.

The radially outer portions of the side plates 25 and 26 are rigidly connected by stop pins 27, which are parallel to the center line 01—01 and extend through circumferentially long recesses 28, FIG. 2, formed at radially outer portions of the flange 13. A pair of friction facings 30 are fixed to the side plate 25 through cushioning plates 29. The facing 30 is adapted to be pressed onto a flywheel (not shown) of an engine by a pressure plate (not shown).

As shown in FIG. 2, the flange 13 is provided with diametrally opposed two openings 31 which are positioned radially outside the openings 20 and continues to them, respectively. Torsion or damper springs 32 extending substantially in the tangential direction are disposed in the openings 31. Side portions of each spring 32 are axially projected beyond the opening 31 and are fitted into axially registered openings 33 and 34 formed in the side plates 25 and 26. The openings 33 and 34 have circumferentially the same length and are circumferentially shorter than those of the openings 31 in the flange 13. Thus, in the illustrated neutral position, both ends of each spring 32 are compressibly engaged with the radial edges of the openings 33 and 34.

Further, the flange 13 is provided with two openings 36, which are ciricumferentially aligned and alternately positioned with respect to the openings 31. Strong torsion springs 37 extending substantially in the tangential direction are compressively disposed in the openings 36, respectively. Side portions of each spring 37 are, as shown in FIG. 3, axially projected beyond the opening 36 and are fitted into axially registered openings 38 and 39 formed in the side plates 25 and 26. The openings 38 and 39 have the same circumferential length and are circumferentially shorter than those of the openings 36. Thus, in the illustrated neutral position, both ends of each spring 37 are compressibly engaged with the radial edges of the openings 38 and 39.

In the neutral position, circumferential length between springs 32 and the edges of the openings 33 and 34 are slightly longer than the circumferential length between the springs 37 and the edges of the openings 38 and 39, respectively.

The sub-plates 14 and 15 are provided at the outer peripheral portion with axially registered recesses 51 (FIG. 1) and axially registered recesses 40 (FIG. 3). In the neutral position, radial edges of the recesses 40 and 51 contact the portions of the springs 32 and 37 axially projected beyond the openings 31 and 36.

Circumferential length of each aperture 17 for the sub-pins 16 is so set that the sub-pins 16 may not ciricumferentially contact the edges of the openings 17 before the springs 37 compressively fitted in the openings 38 and 39 contact the radial edges of the openings 36. The rigidity of the torsion sorings 32 is much larger that of the springs 23.

An operation is as follows. When the facing 30 is pressed onto the flywheel by the pressure plate, a rotational torque in a direction indicated by an arrow X1, FIG. 2, is transmitted from the flywheel through the disc, i.e., the facing 30, cushioning plates 29, side plates 25 and 26, springs 32, 32 and 37, flange 13 and hub 11, to the output shaft.

In the above operation, the srpings 23, 32 and 37 are compressed by a force corresponding to the transmitted torque, so that the side plates 24 and 25 twist or torsionally turn relatively to the flange 13 and the hub 11.

When the torsion angle between the side plates 24 and 25 and the flange 13 is small, i.e., in the first step or stage of the operation, the strong springs 32 and 37 engage only with the side plates 24 and 25 and the sub-plates 14 and 15, so that the sub-plates 14 and 15 turn substantially together with the side plates 24 and 25 with respect to the flange 13, and only the soft springs 23 are largely compressed.

In this stage, sliding does not substantially occurs on the washers 41 and 42. The sliding occurs on the friction washers 18 and 19. This sliding generates a weak frictional force, which causes hysteresis torque in the damping characteristics for absorbing the torque vibration. Although three members (19, 52 and 53) are interposed between the sub-plate 15 and the flange 13, the plate 52 and the sub-plate 15 as well as the wave spring 53 interposed therebetween do not turn relatively to each other, because the friction plate 52 is unrotatably connected to the sub-plate 15. This sliding occurs on the friction washer 19, as stated above. Since the surfaces of the flange 13, washer 19 and the plate 52 contacting each other are flat, the frictional force, and thus, the hysteresis torques are stable.

This first stage, in which the sub-plates 14 and 15 turn relatively to the flange 13, continues until the springs 37 engage the edges of the openings 36 in the flange 13.

In a following stage, the side plates 24 and 25 turn relatively to the sub-plates 14 and 15 and the flange 13. In this stage, the strong torsion springs 32 and 37 are compressed between the side plates 24 and 25 and the flange 13, and sliding occurs on the surfaces of the friction washers 41 and 42, which causes large frictional force, and thus, large hysteresis torque.

In this operation, the projections 44 hold and guide the wahser 41 in the radially accurate position, so that the predetermined uniform space is formed between the washer 41 and the bushing 43. That is, the washer 41 is prevented from radially deviating and irregularly contacting the bushing 43. Thus, the hysteresis torque caused by the friction on the washer 41 is stable.

The second stage of the operation continues until the stop pins 21 circumferentially contact the edges of the recesses 28. After the stop pins 27 contact the edges of the recesses 28, the torque is transmitted from the side plates 24 and 25 through the stop pins 27 to the flange 13.

According to the present invention, as stated hereinbefore, because the friction wahser 41 is radially positioned by the projections formed at the side plate 25, the washer 41 is prevented from irregularly contacting the bushing 43, so that the hysteresis can be stable.

In a modification, projections similar to the projections 44 may be formed on the side plate 26 for radially positioning the washer 42.

The bushing 43 may be eliminated so that the side plate 25 and the friction washer 41 may be directly fitted or disposed around the hub 11.

The present invention may be applied to a damper disc in which sub-plates are eliminated and friction mechanisms are interposed between side plates and a flange of an output hub.

Radially positioning mechanism of the invention may be employed in the friction mechanisms between the sub-plates and the flange.

Although the invention has been described in its preferred form with a certain degree of particularity, it is understood that the structure of the preferred form may be changed in the details of construction, and that the combination and arrangement of parts may be modified to without departing from the spirit and scope of the invention as hereinafter claimed.

What is claimed is:

1. A structure for radially positioning a friction member in a damper disc comprising an output hub including a radial flange; a pair of side plates rotatably disposed at opposite sides of the flange; a torsion spring mechanism operable to circumferentially connect the side plates to the flange; and a friction mechanism rotatably fitted around the hub and associated to one of said side plates for generating a friction force in accordance with relative torsion between said one of said side plates and said flange; said friction member including an annular friction member, said one of said side plates having a plurality of circumferentially spaced projections each cut along three sides of said projection from said one of said side plates and bent inwardly at the fourth side and engaging the outer peripheral end of said annular friction member and radially holding and concentrically guiding said annular friction member concentrically to said hub.

2. A damper disc of claim 1 wherein said projection hold said friction member and form a substantially annular space between the inside of the inner periphery of said member and said hub